F. A. GAHRING.
TIRE CHAIN.
APPLICATION FILED SEPT. 28, 1918.
1,296,069. Patented Mar. 4, 1919.
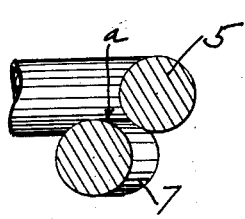
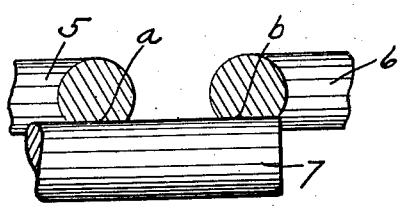
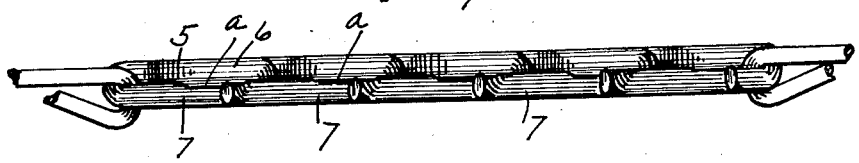
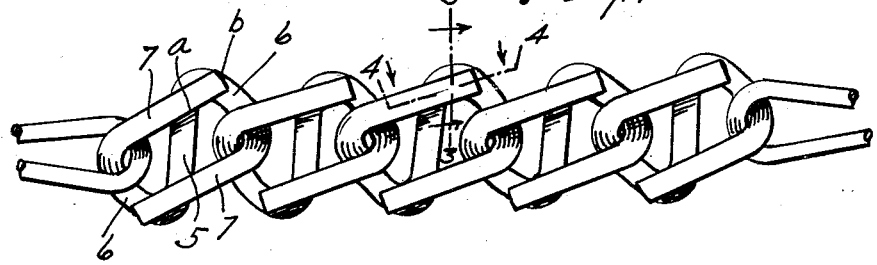
WITNESSES
E. E. Wells
B. G. Baumann
INVENTOR
Frederick A. Gahring
BY HIS ATTORNEYS
Williamson Merchant

UNITED STATES PATENT OFFICE.

FREDERICK A. GAHRING, OF MINNEAPOLIS, MINNESOTA, ASSIGNOR TO PEERLESS CHAIN COMPANY, OF WINONA, MINNESOTA, A CORPORATION OF MINNESOTA.

TIRE-CHAIN.

1,296,069.  Specification of Letters Patent.  Patented Mar. 4, 1919.

Application filed September 28, 1918. Serial No. 255,998.

*To all whom it may concern:*

Be it known that I, FREDERICK A. GAHRING, a citizen of the United States, residing at Minneapolis, in the county of Hennepin and State of Minnesota, have invented certain new and useful Improvements in Tire-Chains; and I do hereby declare the following to be a full, clear, and exact description of the invention, such as will enable others skilled in the art to which it appertains to make and use the same.

My present invention relates to non-skid tire chains and is in the nature of an improvement on or refinement of the non-skid chain disclosed and broadly claimed in my co-pending application, S. N. 140,869, filed January 6, 1917, and allowed of date, May 13, 1918.

The links of the present improved chain, as well as the links of the chain disclosed and broadly claimed in my prior application are of the double loop type, but in the present improved arrangement, the double loops of the links are bent into approximately triangular arrangement, and the side arms of the links are in approximately parallel arrangement and are extended across the projecting angles of the triangular loops, and each such arm is welded to the respective triangular loop at two different points. This gives a very strong trussed structure to the links and gives a very wide and flat ground engaging, as well as tire engaging faces to the chain.

The improved chain is illustrated in the accompanying drawings wherein like characters indicate like parts throughout the several views. Referring to the drawings, Figure 1 is a bottom plan view of the non-skid tread chain;

Fig. 2 is an edge elevation of the same;

Fig. 3 is an enlarged section on the line 3—3 of Fig. 1; and

Fig. 4 is an enlarged section on the line 4—4 of Fig. 1.

In the drawings, I have shown connected links which make up one of the cross or tread chains of a complete non-skid tire chain. The links of this tread chain which have the peculiar form above generally stated, are each made up of a single piece of heavy steel wire or light steel rod bent to form an approximately straight oblique portion 5, end portions 6, and side portions 7. The said members 5, 6 and 7, as will be noted, give the links a double loop form in which the loops are approximately triangular and the side portions 7 are extended across the projected angles of the loops and welded thereto at the points marked $a$ and $b$ (see particularly Figs. 1 and 4), wherein it will be noted that the welds $a$ are between members 5 and 7 while the welds $b$ are between the members 5 and 6. Also it will be noted that the members 7 are pressed slightly into said members 5 and 6, so that the welds will cover considerable surface. This arrangement gives an exceedingly strong fastening for the ends of the side arms 7, and trusses and braces the entire link so that it is made exceedingly strong. The side members 7 being approximately parallel and both being engageable with the road bed, give the chain a very wide or transversely extended road engagement. Also, the back of the chain is given a wide face for engagement with the tire.

By reference particularly to Fig. 2, it will be noted that the side members 7, throughout their main portions, are approximately in the same plane. In fact, with this arrangement, the pressure from the tire will be independently applied to the single links, each link having its own complete engagement between the tire and the roadbed, so that there is little or no strain transmitted from the one link to the other and little or no tendency to cause the breaking of links under load.

By reference to Fig. 1 it will be further noted that the end portions 6 and side portions 7 of the links are at an angle considerably less than ninety degrees to each other so that the triangular loops have angles projecting at opposite ends of the links. This is important, because, under pull on the chain, the links are caused to aline by a seating action produced at the ends of the links.

The links, in a general way, may be described as approximately a figure 8 shape, yet in the present instance, they have a peculiar or characteristic form of a figure 8 by which the links have approximately parallel ends and an oblique intermediate portion. This arrangement gives a maximum width of bearing and greatest possible strength and longest possible wearing quality together with a maximum non-skid action and a minimum wear on the tire.

What I claim is:

1. A non-skid tire chain made up of interlocking links, said links being formed with double approximately triangular loops and with approximately parallel side members, said side members being welded to the extended angles of said triangular loops.

2. A non-skid tire chain made up of interlocking links, said links being formed, each with an oblique intermediate portion, with approximately parallel end members and with approximately parallel side members, the end portions of said side members being extended across the projecting angles of said triangular loops and each such side member being welded both to said oblique portion and to the adjacent end member of said link.

3. A non-skid tire chain made up of interlocking links, said links being formed, each with an oblique intermediate portion, with approximately parallel end members and with approximately parallel side members, the end portions of said side members being extended across the projecting angles of said triangular loops and each such side member being welded both to said oblique portion and to the adjacent end member of said link, the said side and end members forming angles of less than ninety degrees, and these angles of the respective links being directly engaged.

4. A non-stop tire chain made up of interlocking links, said links being formed with double approximately triangular loops and with approximately parallel side members, said side members being welded to the extended angles of said triangular loops, the said parallel side members of said links being on the road engaging side of the chain and adapted for simultaneous flatwise engagement with the road.

In testimony whereof I affix my signature in presence of two witnesses.

FREDERICK A. GAHRING.

Witnesses:
BERNICE G. BAUMANN,
HARRY D. KILGORE.